(12) United States Patent
Chang et al.

(10) Patent No.: US 6,325,346 B1
(45) Date of Patent: Dec. 4, 2001

(54) KEYBOARD MOUNTING APPARATUS AND METHOD FOR A PERSONAL COMPUTING APPLIANCE

(75) Inventors: S. Kuen Chang, Chicago; Mark J. Fisher, Highland Park, both of IL (US)

(73) Assignee: 3COM Corporation, Rolling Meadows, IL (US)

( * ) Notice: Subject to any disclaimer, the term of this patent is extended or adjusted under 35 U.S.C. 154(b) by 0 days.

(21) Appl. No.: 09/657,681

(22) Filed: Sep. 8, 2000

(51) Int. Cl.[7] ............................. A47K 1/00; H05K 5/00
(52) U.S. Cl. .................. 248/225.11; 248/694; 248/918; 361/680; 361/681
(58) Field of Search .................. 248/225.11, 225.21, 248/223.41, 304, 688, 992, 694, 918; 361/600, 625, 657, 680, 685, 681

(56) References Cited

U.S. PATENT DOCUMENTS

| | | | |
|---|---|---|---|
| 4,899,971 | * | 2/1990 | Elkin ............................... 248/225.11 |
| 4,946,121 | * | 8/1990 | Troke .................................. 248/201 |
| 5,055,839 | * | 10/1991 | Davis et al. ........................... 341/22 |
| 5,260,884 | * | 11/1993 | Stern .................................. 361/681 |
| 5,440,502 | * | 8/1995 | Register .............................. 361/681 |
| 5,712,760 | * | 1/1998 | Coulon et al. ....................... 361/680 |
| 5,729,429 | * | 3/1998 | Margaritis et al. .................. 361/680 |
| 5,786,983 | * | 7/1998 | Brenner et al. ..................... 361/680 |

* cited by examiner

Primary Examiner—Anita King
(74) Attorney, Agent, or Firm—Baniak Pine & Gannon

(57) ABSTRACT

A keyboard mounting apparatus and method for stowing a keyboard on a sub-compact, computer-based information appliance. In particular, the apparatus includes an extending portion located at the rear of the appliance housing and a corresponding interlocking portion located on the keyboard which allows a user to easily stow and retrieve the keyboard from the housing of the appliance.

13 Claims, 3 Drawing Sheets

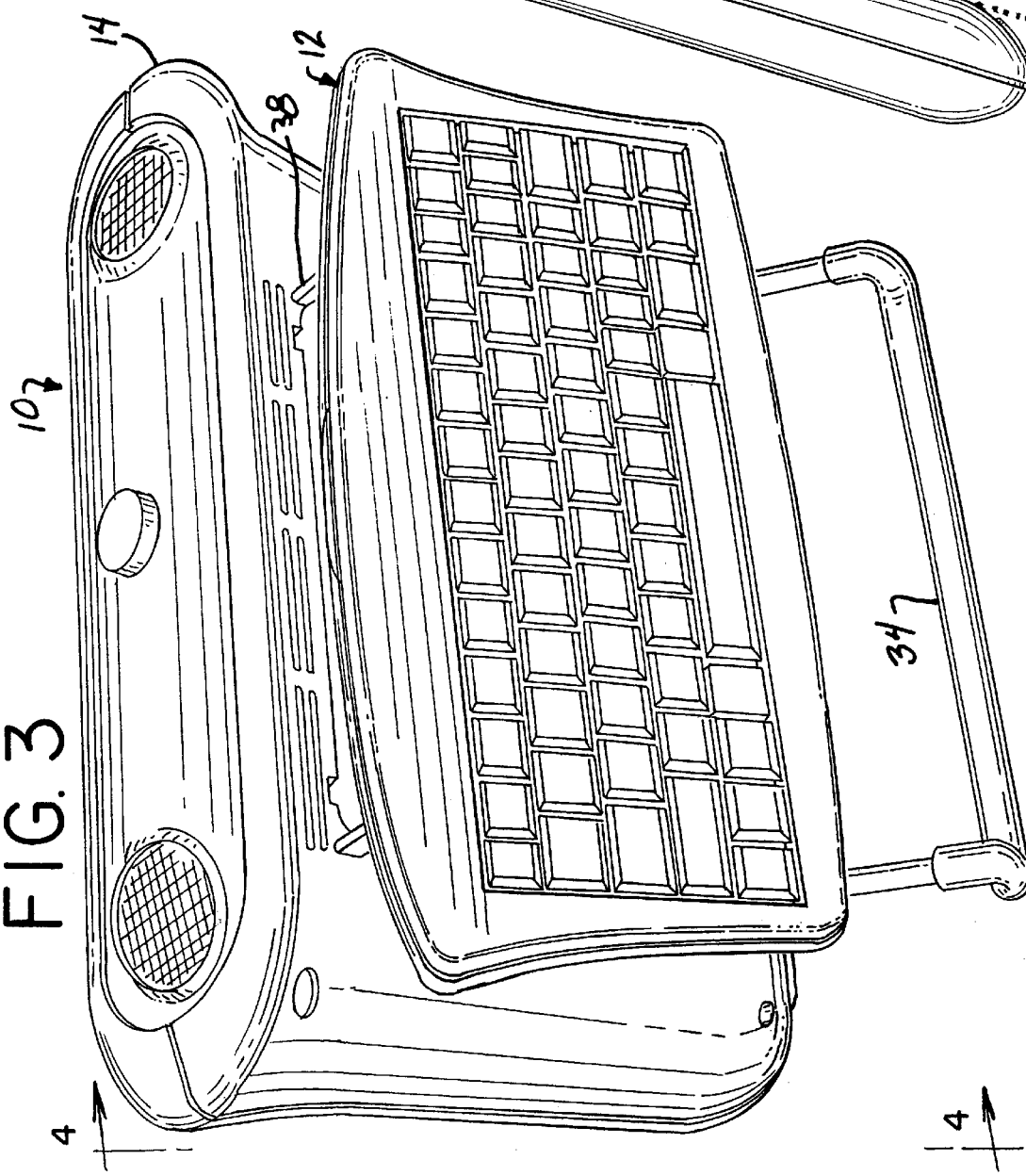
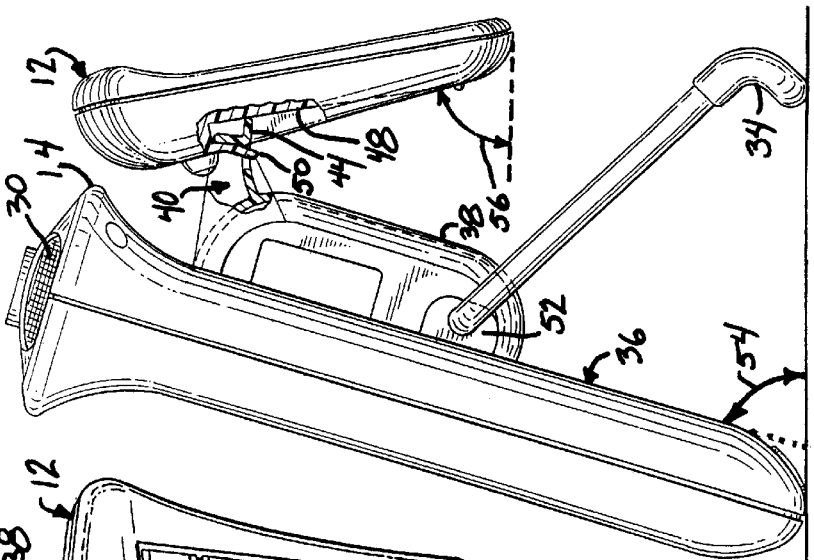

KEYBOARD MOUNTING APPARATUS AND METHOD FOR A PERSONAL COMPUTING APPLIANCE

FIELD OF THE INVENTION

The present invention generally relates to a keyboard mounting apparatus and method for stowing a keyboard on a sub-compact, computer-based information appliance. In particular, the apparatus includes an extending portion located at the rear of the appliance housing and a corresponding interlocking portion located on the keyboard which allows a user to easily stow and retrieve the keyboard from the housing of the appliance.

BACKGROUND OF INVENTION

Computers have developed from early room-sized mainframes, to personal computers which occupy a portion of a desktop, to early portable "suit case" designs, including the smaller "laptop", "notebook" and "sub-compact" designs. While early portables were bulky and inefficient, the more recent laptops, notebooks and personal digital assistants (PDA) have improved considerably due to the implementation of a portable battery supply, light weight circuitry and computer storage devices in a compact housing which is easily transported by the user. "Notebook" personal computers have increasingly advanced to provide substantially all the functions of conventional desktop computers. As a result of the reduction of the size of the latest portable computing devices, designers have attempted to reduce the size of the keyboard so that it conforms to the overall size of the system.

Some designers have chosen to reduce the size of the keys and thus the keyboards, while others have chosen to eliminate or combine certain functions provided in more conventional keyboards. Other methods have been proposed and implemented to provide a full function keyboard or keyboard function to these smaller computing devices including, for example, hinged and folding keyboards, touch screen keyboards and various screen activation systems.

In response to consumer demand and technological advances, increasingly smaller and specialized computing devices have been designed. Users have embraced the smaller PDAs and the like which, while designed to provide a lesser number of capabilities than personal computers (PCs), provide the most essential and used computer functions in a design which may be carried in a pocket. The specialized functions may include scheduling functions, an address database, spreadsheet applications and simple word processing or note producing applications. These devices, which are typically referred to as digital information devices, computer information appliances, etc, by nature are special use devices. Many of these specialized computing devices combine PDA-like functions with more powerful applications, like full feature Internet connectivity and e-mail capability. In such a case, it would be desirable to have both a touch screen functionality like that provided by a PDA for simple tasks like retrieving a phone number or a calendar, and a convenient keyboard arrangement for other functions such as composing long e-mails, documents or the like. To that end, it would be useful to be able to quickly stow and retrieve the associated keyboard in a convenient manner.

SUMMARY OF THE INVENTION

The present invention is directed to providing a mounting apparatus for stowing a keyboard on a housing of a personal computing appliance. In one embodiment, the personal computing appliance includes a housing. The housing includes a front panel with a display and a back panel opposite the front. An extended mounting portion is located on the back panel of the housing. The extended mounting portion includes a recess which may be located in the top side of the extended mounting portion. The recess defines a pocket. The pocket may also include an opening. The opening may extend in a horizontal direction to define a slot.

A keyboard module includes a main body portion with a plurality of keys and an extending tab portion. The tab portion is located on the underside of the keyboard main body. The tab portion may be substantially parallel to and spaced apart from the keyboard main body underside to form a hook-like feature. The tab portion on the keyboard is inserted into the recess in the extended mounting portion of the housing to mount or stow the keyboard at the rear of the housing of the personal computing appliance.

Another embodiment of the present invention includes the housing being provided with a foldable stand, leg or bracket which is extendable to maintain the housing in a generally upright position. The stand may be folded flush against the housing or into a recess formed into the housing to permit the housing to be used in a generally flat or horizontal position.

In another embodiment of the present invention, the extended mounting portion on the housing includes an extending spacing tab. The extended spacing tab extends outwardly from the extended mounting portion to contact the underside of the keyboard module when the keyboard module is stowed on the housing of the personal computing appliance. In this manner, the keyboard module main body is maintained at an angle away from the housing. In one embodiment, the angle is about 80° with respect to horizontal. The spacing tab also serves to maintain the housing at an angle of about 10° from the horizontal when the housing is placed back side down or lowered into a generally flat position with the display facing generally upwardly. In yet another embodiment, the spacing tab is a plurality of tabs.

In yet another embodiment, the extended portion on the housing is a detachable shroud.

In yet another embodiment, the present invention includes a method of stowing a keyboard module on the housing of a personal computing appliance. In the method, a keyboard module is provided with a main body having a tab portion on an underside. The housing portion includes an extending portion on a back panel of the housing adapted to receive the tab portion. The method includes engaging the tab portion of the keyboard module main body with the extending portion of the housing to stow the keyboard module when the housing of the personal computing appliance is in a generally upright position.

BRIEF DESCRIPTION OF THE DRAWINGS

FIG. 3 is a rear perspective of the present invention illustrating the keyboard module in a stowed position.

FIG. 4 is a side view of FIG. 3 illustrating a partial cutaway of the attaching apparatus in cross section.

DETAILED DESCRIPTION OF A PRESENTLY PREFERRED EMBODIMENT

It should be noted from the outset that the present invention is described in the following detailed description in terms a preferred embodiment. It will be readily understood that the present invention may be embodied other than as described without departing from the fair scope of its teachings. With this in mind, the present invention provides an apparatus and method to stow a keyboard module on the housing of an personal computing appliance.

In the specification, the term "personal computing appliance" (PCA) refers to a device typically having a central processing unit "CPU", computer readable program code and a display. These devices may also be referred to as an internet appliance (when provided with internet capability) or electronic computing appliance. Typically, these devices are relatively small (about the size of a sub-notebook) compared to PCs, have a small footprint and, while more portable than many "portable computers," are intended to be used as countertop computing devices.

Figure 1:
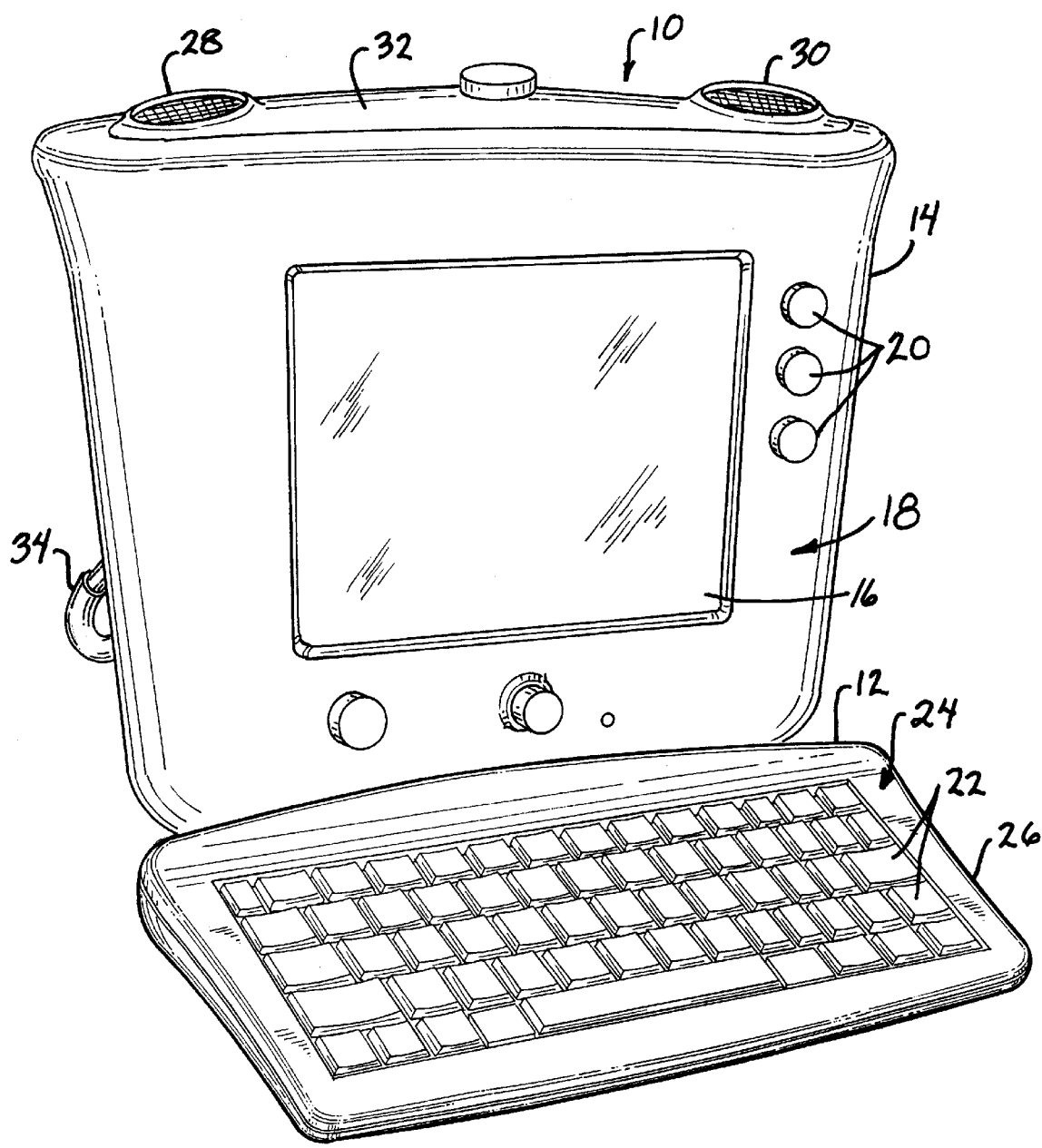
FIG. 1 is a front perspective view of the present invention illustrating the housing of the personal computing appliance in an upright position and the associated keyboard module.

Referring now to the figures, with like numerals being used for like and corresponding parts of the various drawings, FIG. 1 illustrates a personal computing appliance 10 with an associated keyboard module 12. The present invention contemplates both wired and wireless keyboards. The present embodiment illustrates a wireless keyboard module. The personal computing appliance 10 includes a housing 14 with a flat screen 16 on the front panel 18 of the housing 14. The personal computer appliance 10 is provided with various mechanisms 20 (i.e., knobs, switches or the like) to control various functions, for example, screen brightness, screen contrast, volume, internet channel, on/off, etc. The mechanisms 20 may protrude through the housing 14 front panel so as to be accessible by the user. In this embodiment, the keyboard module 12 is a wireless keyboard module with a plurality of keys 22 located on the top or front surface 24 of main body 26 of the keyboard module 12.

In this embodiment, the housing 14 encloses a computer processing unit or chip (CPU) (not shown) and a flat display screen 16. In another words, the housing 14 encloses the main components of the personal computer appliance 10. It will be understood that the exact number and arrangement of the elements making up the internal components of the personal computer appliance 10 is not critical to the invention. Left speaker 28 and right speaker 30 may be located on a top panel 32 of the housing 14. Stand 34, described in more detail below, operates to maintain the housing 14 in a nearly upright position.

Figure 2:
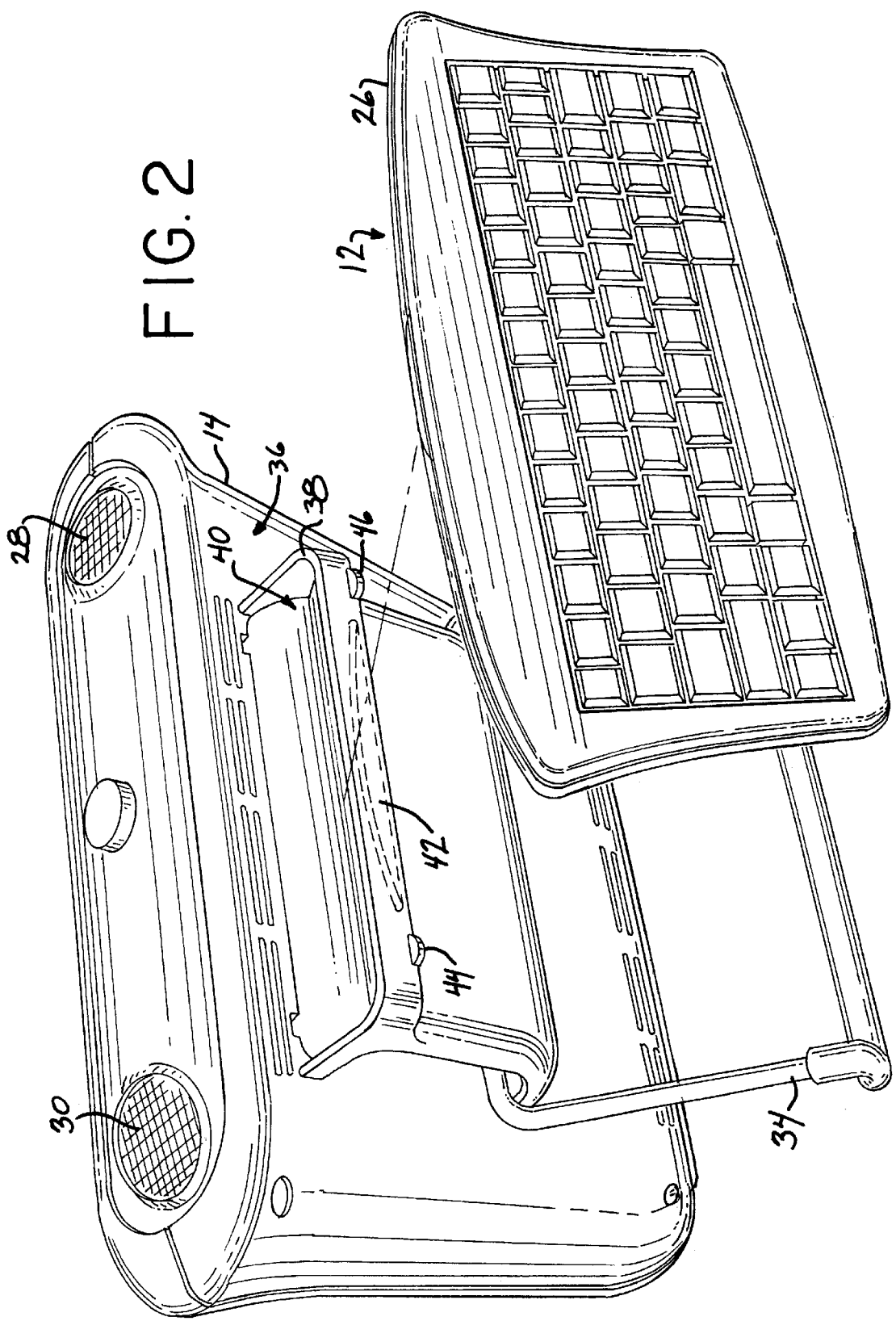
FIG. 2 is an exploded rear perspective view of the present invention illustrating the keyboard module and the back panel of the appliance housing and extended mounting portion.

FIG. 2 shows an exploded rear perspective view of a preferred embodiment of the present invention with the keyboard module 12 adjacent the back panel 36 of the housing 14. The back panel 36 of the housing 14 is uniquely provided with an extended mounting portion 38 or shroud attached to the housing 14. The term "shroud" may be used when the extended portion 38 extends to cover various connectors for making connections to the computer such as serial communication ports, parallel communication ports, modem, external power, audio in/out jacks, digital in/out, USB ports and so on.

The extended portion 38 is provided with a recess 40 which defines a pocket, groove, concavity, or the like. The recess 40 may have an opening 42 or slot for engaging with the keyboard module 12. The extended mounting portion 38 is further provided with spacing tabs 44, 46. The spacing tabs 44, 46 contact the underside (see FIG. 4) of the main body 26 of the keyboard module 12 to space the keyboard module away from the back panel 36 of the housing 14 when the keyboard module 12 is in the stowed or docked position (see FIG. 3). The spacing tabs 44, 46 also operate to tip the housing 14 up at an angle when the housing 14 is caused to lie flat on a surface (not shown) with the back panel 36 being adjacent the surface. The angle of the housing relative to the surface is about 10. The back panel 36 of the housing 14 is further provided with a folding stand 34 for bracing the housing 14 in a generally upright position. In another embodiment, the extended mounting portion 38 is formed integrally with the back panel 36 of the housing 14.

FIG. 3 shows essentially the same view of the present invention as illustrated in FIG. 2. However, the keyboard module 12 is shown in the stowed or docked position. As will be explained more fully in the description of FIG. 4, an underside or rear portion (not shown) of the keyboard module 12 is engaged with the extended mounting portion 38 of the personal computing appliance housing 14. Stand 34 maintains the appliance 10 in a generally upright position.

FIG. 4 illustrates a side view of the embodiment of the present invention as shown in FIG. 3 including a partial cutaway of the apparatus providing engagement between the extending mounting portion 38 on the back panel 36 of the housing 14 and the keyboard module 12. In particular, the underside 48 of the keyboard module 12 includes a tab portion 50 which is spaced apart from the underside 48 and forms a hook-like feature with the underside 48. When the tab portion 50 is placed onto the extended mounting portion 38 of the housing 14, the tab portion 50 extends through the recess 40 and operates to hold the keyboard module 12 in place against the extended mounting portion spacing tab 44.

The stand 34, which may be a leg, bracket or the like, is attached to the back panel 36 of the housing 14 by locking mechanism 52. The locking mechanism 52 enables the stand 34 to extend to a position which holds the housing 14 in a generally upright position. In one embodiment, the angle 54 of the housing 14 is about 80°. Similarly, when the keyboard module 12 is stowed at the rear of the housing 14, the angle 56 of the keyboard module 12 is about 80°. It should be understood that the present invention contemplates that the keyboard and housing may be held at a range of angles. While it is not shown in the illustrations it should be understood that when the keyboard module 12 is not stowed at the rear of the housing 14 the housing may be set into a generally horizontal position. Thus, the stand 34 is retracted into a position flat against the back panel 36 and the housing 14 is laid flat onto a surface. It can be seen that spacing tabs 44, 46 would therefore maintain the front display screen 16 at a slightly up-tilted angle to reduce reflections, glare from overhead lights and make the screen 16 easy to view from a user perspective.

The present invention may be embodied in other specific forms without departing from its spirit or essential characteristics. The described embodiments are to be considered in all respects only as illustrative and not restrictive.

We claim:

1. A mounting apparatus for stowing a keyboard on a personal computing appliance comprising:
    a housing accommodating a display panel on a front panel of the housing and having an extended mounting portion located on a back panel of the housing, the extended mounting portion having a recess defining a pocket;
    a keyboard module having a main body and a tab portion, the tab portion being located on an underside of the main body and spaced apart from the main body, the tab portion being adapted to insert into the pocket to mount the keyboard module on the housing of the personal computing appliance.

2. The mounting apparatus of claim 1 wherein the pocket in the extended mounting portion is located in a top portion of the extended mounting portion.

3. The mounting apparatus of claim 1 wherein the tab portion is substantially parallel to the underside of the main body of the keyboard module.

4. The mounting apparatus of claim 1 wherein the pocket includes an opening formed therein adapted to accept the tab portion of the keyboard module.

5. The mounting apparatus of claim 1 wherein the recess is a slot which extends horizontally.

6. The mounting apparatus of claim 1 wherein the housing further comprises a foldable stand located on the back panel of the housing which, when extended, maintains the housing in a generally upright position and when folded against the housing permits the housing to lie in a generally horizontal position.

7. The mounting apparatus of claim 1 wherein the keyboard module is stowed when the housing is in an upright position.

8. The mounting apparatus of claim 1 wherein the extended mounting portion further includes an extended spacing tab which contacts a rear portion of the keyboard module main body when the keyboard module is stowed on the housing to space the keyboard module main body away from the back panel of the housing.

9. The mounting apparatus of claim 8 wherein the extended spacing tab is adapted to maintain the housing at about 10° from a generally horizontal surface when the housing is lowered to the surface.

10. The mounting apparatus of claim 8 wherein the keyboard module main body is maintained in a spaced apart position from the back panel of the housing by the spacing tab at an angle of about 80° from the horizontal.

11. The mounting apparatus of claim 8 wherein the extended spacing tab is a plurality of tabs.

12. The mounting apparatus of claim 1 wherein the extended portion is located on a shroud which connects to the back panel of the housing.

13. A method of stowing a keyboard module on the housing of an personal computing appliance wherein the keyboard module includes a main body with a tab portion on an underside of the main body and the housing includes an extending portion on a back panel of the housing adapted to receive the tab portion comprising the step of:

engaging the tab portion of the keyboard module main body with the extending portion of the housing to stow the keyboard module when the housing of the personal computing appliance is in a generally upright position.

* * * * *